(12) United States Patent
Apostolides

(10) Patent No.: US 6,941,969 B2
(45) Date of Patent: Sep. 13, 2005

(54) VEHICLE FLUID CHANGE APPARATUS

(75) Inventor: John Apostolides, Pittsburgh, PA (US)

(73) Assignee: RPM Industries, Inc., Washington, PA (US)

( * ) Notice: Subject to any disclaimer, the term of this patent is extended or adjusted under 35 U.S.C. 154(b) by 109 days.

(21) Appl. No.: 10/414,360

(22) Filed: Apr. 15, 2003

(65) Prior Publication Data

US 2004/0045609 A1 Mar. 11, 2004

Related U.S. Application Data

(63) Continuation of application No. 09/772,604, filed on Jan. 30, 2001, now Pat. No. 6,708,710, which is a continuation-in-part of application No. 09/435,375, filed on Nov. 5, 1999, now Pat. No. 6,216,732, which is a continuation-in-part of application No. 08/961,339, filed on Oct. 30, 1997, now abandoned.

(51) Int. Cl.[7] .............................. G05D 7/00; F17D 1/16
(52) U.S. Cl. ........................... 137/565.17; 137/565.33; 137/560; 137/625.41; 137/899
(58) Field of Search ...................... 137/560; 184/196 S, 184/1.5, 6.3

(56) References Cited

U.S. PATENT DOCUMENTS

| | | | |
|---|---|---|---|
| 1,379,259 A | | 5/1921 | Hans |
| 1,815,221 A | * | 7/1931 | Sweetland ............... 184/1.5 |
| 2,029,781 A | | 2/1936 | McLean |
| 2,102,514 A | * | 12/1937 | Clarkson ............... 184/6.3 |
| 2,110,662 A | | 3/1938 | Fisher |
| 2,143,533 A | | 1/1939 | Archea et al. |
| 2,320,048 A | * | 5/1943 | Parson ................ 184/1.5 |
| 2,603,312 A | * | 7/1952 | Tabet ................. 184/1.5 |
| 2,838,039 A | | 6/1958 | Smith et al. |
| 2,887,058 A | | 5/1959 | Aspelin et al. |
| 2,928,499 A | | 3/1960 | Nalinger |

(Continued)

FOREIGN PATENT DOCUMENTS

| | | |
|---|---|---|
| DE | 197 43917 A1 | 4/1999 |
| EP | 0 416 688 A1 | 3/1991 |
| WO | WO 02/27186 A1 | 4/2002 |

OTHER PUBLICATIONS

Oil X–Change–R Systems, www.x–change–r.com, Internet Website, pages printed Feb. 18, 2003.
International Search Report for International Application PCT/US 02/02415, Oct. 10, 2002.

(Continued)

*Primary Examiner*—A. Michael Chambers
(74) *Attorney, Agent, or Firm*—Kirkpatrick & Lockhart Nicholson Graham LLP

(57) ABSTRACT

A fluid transfer system includes elongated conduits connected at one end with couplings to a plurality of fluid reservoirs of a machine or engine and at the other end with a control valve for selective quick evacuation. Evacuation is powered by a pump operably connected to the control valve. Another embodiment includes a first pump for the evacuation of an engine oil reservoir and a second pump for the selective evacuation of transmission and hydraulic fluid reservoirs. The control valve and the pumps may be operated remotely through electrical switches on brackets or on a service panel. Associated methods of removing fluids and replacing fluids from a plurality of reservoirs includes coupling the fluid transfer system to the reservoirs.

91 Claims, 15 Drawing Sheets

U.S. PATENT DOCUMENTS

| | | | |
|---|---|---|---|
| 3,045,420 A | | 7/1962 | Addie et al. |
| 3,057,436 A | | 10/1962 | Jacobson et al. |
| 3,146,720 A | | 9/1964 | Henry |
| 3,282,380 A | | 11/1966 | Burrell et al. |
| 3,430,730 A | * | 3/1969 | Kitajima ............... 184/1.5 |
| 3,503,412 A | * | 3/1970 | Schuler ............... 137/265 |
| 3,583,525 A | | 6/1971 | Holcomb |
| 3,583,527 A | | 6/1971 | Raichel |
| 3,585,686 A | | 6/1971 | Balle |
| 3,658,153 A | | 4/1972 | Berman |
| 3,722,623 A | | 3/1973 | Waldecker |
| 3,802,564 A | | 4/1974 | Turman |
| 3,826,113 A | * | 7/1974 | Boraas et al. ............ 68/12.18 |
| 3,858,686 A | | 1/1975 | Luterick |
| 3,917,027 A | | 11/1975 | Hakanson et al. |
| 4,014,794 A | | 3/1977 | Lewis |
| 4,058,981 A | | 11/1977 | Henson |
| 4,061,204 A | | 12/1977 | Kautz, Jr. |
| 4,094,293 A | | 6/1978 | Evans |
| 4,095,673 A | * | 6/1978 | Takeuchi ............... 184/1.5 |
| 4,112,910 A | | 9/1978 | Percy |
| 4,126,997 A | | 11/1978 | Henson |
| 4,157,744 A | | 6/1979 | Capriotti |
| 4,168,693 A | | 9/1979 | Harrison |
| 4,174,699 A | | 11/1979 | Gill |
| 4,199,950 A | | 4/1980 | Hakanson et al. |
| 4,240,523 A | | 12/1980 | Nestor et al. |
| 4,290,739 A | | 9/1981 | Korse |
| 4,331,112 A | | 5/1982 | Pluequet |
| 4,354,574 A | * | 10/1982 | Kieber ............... 184/1.5 |
| 4,378,675 A | | 4/1983 | Otto |
| 4,402,287 A | | 9/1983 | Cochran |
| 4,421,078 A | | 12/1983 | Hurner |
| 4,458,644 A | | 7/1984 | Papst |
| 4,462,350 A | | 7/1984 | Kurata |
| 4,502,431 A | | 3/1985 | Lulich |
| 4,502,451 A | | 3/1985 | Duprez |
| 4,512,298 A | | 4/1985 | Hayashi |
| 4,553,512 A | | 11/1985 | Showman |
| 4,628,877 A | | 12/1986 | Sundles et al. |
| 4,813,853 A | | 3/1989 | Otto et al. |
| 4,834,039 A | | 5/1989 | Apostolides |
| 4,875,551 A | | 10/1989 | Lulich |
| 4,893,598 A | | 1/1990 | Stasiuk |
| 4,965,549 A | | 10/1990 | Koike |
| 4,977,978 A | | 12/1990 | Batrice |
| 5,014,820 A | | 5/1991 | Evans |
| 5,048,578 A | | 9/1991 | Dorf et al. |
| 5,056,621 A | | 10/1991 | Trevino |
| 5,168,845 A | | 12/1992 | Peaker |
| 5,195,476 A | | 3/1993 | Schwarz |
| 5,198,698 A | | 3/1993 | Paul et al. |
| 5,203,429 A | | 4/1993 | Zager |
| 5,236,064 A | | 8/1993 | Wagoner |
| 5,244,367 A | | 9/1993 | Aslin |
| 5,257,678 A | | 11/1993 | Stokes |
| 5,327,862 A | | 7/1994 | Bedi |
| 5,353,760 A | | 10/1994 | Zager |
| 5,390,762 A | | 2/1995 | Nelson |
| 5,431,138 A | | 7/1995 | Hurner |
| 5,443,138 A | | 8/1995 | Bedi et al. |
| 5,452,695 A | | 9/1995 | Bedi |
| 5,462,420 A | | 10/1995 | Stehr et al. |
| 5,511,522 A | | 4/1996 | Tran |
| 5,526,782 A | | 6/1996 | Bedi et al. |
| 5,566,781 A | | 10/1996 | Robert et al. |
| 5,699,764 A | | 12/1997 | Allen et al. |
| 5,743,231 A | | 4/1998 | Reinosa |
| 5,748,500 A | | 5/1998 | Quentin et al. |
| 5,759,013 A | | 6/1998 | Miyazaki et al. |
| 5,797,732 A | | 8/1998 | Watanabe et al. |
| 5,823,750 A | | 10/1998 | Hoffmann et al. |
| 5,894,825 A | | 4/1999 | Duerr |
| 5,957,240 A | | 9/1999 | Apostolides |
| 5,964,256 A | | 10/1999 | Bedi et al. |
| 6,215,728 B1 | | 4/2001 | Yamada |
| 6,216,732 B1 | | 4/2001 | Apostolides |
| 6,461,118 B1 | | 10/2002 | Apostolides et al. |
| 6,542,851 B2 | | 4/2003 | Hasegawa et al. |
| 6,544,008 B1 | | 4/2003 | Apostolides et al. |
| 6,561,219 B1 | | 5/2003 | Apostolides |
| 2003/0150256 A1 | | 8/2003 | Jakoby et al. |
| 2003/0202887 A1 | | 10/2003 | Apostolides et al. |

OTHER PUBLICATIONS

RPM Industries, Inc., Prelub The Simple Solution, tri–fold brochure, May 6, 1992, United States, 2 pages.

RPM Industries, Inc., "Prelub Plus Oil Evacuation System," dual sided brochure, Feb. 2, 1999, United States, 2 pages.

RPM Industries, Inc., "Prelub Plus—The engine–saving, money–saving, time–saving starter system," single page brochure, Jun. 22, 1999, United States, 1 page.

RPM Industries, Inc., "Prelub Plus [Protection from the Start]," tri–fold brochure, Mar. 2, 1999, United States, 6 pages.

U.S. Appl. No. 08/961,339, filed Oct. 30, 1997.
U.S. Appl. No. 09/435,375, filed Nov. 5, 1999.
U.S. Appl. No. 09/772,604, filed Jan. 30, 2001.
U.S. Appl. No. 10/253,950, filed Sep. 24, 2002.
U.S. Appl. No. 10/347,958, filed Jan. 21, 2003.
U.S. Appl. No. 09/836,610, filed Apr. 16, 2003.

* cited by examiner

VEHICLE FLUID CHANGE APPARATUS

CROSS REFERENCE TO RELATED APPLICATIONS

This application is a continuation application of U.S. patent application Ser. No. 09/772,604, filed on Jan. 30, 2001 now U.S. Pat. No. 6,708,710, which is a continuation in part application of U.S. application Ser. No. 09/435,375, filed on Nov. 5, 1999, now U.S. Pat. No. 6,216,732, issued Apr. 17, 2001, which is a continuation in part of U.S. application Ser. No. 08/961,339, filed on Oct. 30, 1997, entitled "Portable Fluid Transfer Conduit", now abandoned.

BACKGROUND

1. Field of Invention

The present invention relates to fluid transfer conduit having flow control means and an adapter means for connection with a source of fluid, and, in particular, to a portable fluid transfer conduit that is useful in the removal of fluids from equipment which do not have conveniently located outlet ports.

The invention also relates to apparatuses and methods for draining and replacing fluids from reservoirs on vehicles and other equipment or devices having one or more fluid containing reservoirs.

2. Description of the Invention Background

Many industrial machines and equipment have requirements for fluid exchanges. Examples of these include changing the oil in motors and engines or hydraulic fluid in presses and lifting equipment. Countless other examples exist, but what is generally common to these machines or equipment is the fact that the outlet port is inconveniently located. Typically this is the result of having to remove the fluid from a sump or drainage point that is located at the bottom of the machine to utilize gravity flow.

While the task of removal is not difficult, it is often time consuming because of the inconvenient location of the fittings. However, in a number of the newer or retrofit machines, fluid circulation pumps are provided which are external to the machine or engine. Also, some of the newer equipment is fitted with external prelubrication devices which permit oil or fluid to commence circulation prior to the activation of the primary equipment or engine on which it is fitted. Illustrative of such devices is the prelubrication device shown in U.S. Pat. No. 4,502,431 which is incorporated herein by reference, which is typically fitted to a diesel Engine used in power equipment, trucks or heavy equipment. Also, circulation devices used to heat hydraulic fluid are applicable to the present invention.

Furthermore, in certain off-road heavy equipment, the reservoirs containing their fluids may contain scores of gallons of fluid, which take unacceptably long to drain and refill. For example, in some equipment an engine oil sump or reservoir may contain up to 150 gallons of oil; a transmission sump may contain up to 100 gallons of transmission fluid; and a separate reservoir of hydraulic fluid to power hydraulic functions may contain up to 500 gallons of hydraulic fluid. In equipment valued from one hundred thousand to millions of dollars per unit, downtime costs are enormous. Accordingly, if downtime for maintenance in such apparatuses can be minimized, substantial economic benefits will result.

Additionally there are numerous smaller devices and motors where access to fluid discharge ports is difficult to reach or in which the fluid must be assisted for removal. Examples include marine engines and the like. In some small sized equipment, the engine must be inverted to remove the oil or other fluid. See also U.S. Pat. No. 5,526,782, 5,257,678 and 4,997,978.

Accordingly, it is an object of the invention to provide portable fluid transfer conduit that will facilitate the removal of fluids remote from the discharge port. It is also an object of the present invention to provide a conduit for use in fluid transfer that is adapted to fit a discharge port and remotely control the flow of fluid from an engine or equipment. Another object of the invention is to provide a portable transfer conduit that includes fluid pump means for extracting fluid from a machine or engine. A further object of the invention is adapter means for connecting the fluid transfer conduit to an outlet port for such fluid. Another object of the invention is an adapter connector for coupling an air evacuation means to purge or remove part of the fluid from the channels of the machine and filter. Yet another object is to provide apparatuses and methods for facilitating the removal of fluids from one or more fluid reservoirs to expedite fluid removal and changeover. Closely related to these objects are the additional benefits of saving time for the service technicians by making faster flow rates for removal or replacement fluids possible, thus increasing efficiency, creating a safer environment by providing controlled evacuation and replacement of fluids from a remote location, thus minimizing spilling, and contributing to noise reduction by providing a remote fluid replacement location so that engine compartments may contain more fixed noise shields.

SUMMARY OF THE INVENTION

Generally, the present invention comprises a portable fluid transfer conduit having at least one flexible fluid conduit. Typically the conduit is made from a rubber or polymeric material, stainless steel braiding or the like. In most typical applications it comprises a polyethylene or propropylene tubing. The conduit includes an inlet port and an outlet port. The inlet port is adapted for connection with the discharge port of a fluid source such as the sump of an engine, a hydraulic sump, a transmission sump, or a prelubrication pump. In one preferred embodiment of the invention, a coupler is provided at the inlet port to couple the conduit with discharge port of the fluid source. Most preferably, a quick connect-disconnect fitting is secured to the inlet port of the conduit and a mateable fitting therewith at the discharge port.

A flow control means is positioned adjacent the outlet port of the conduit for controlling the flow of fluid from said source, such as an engine sump, through the conduit. In one preferred embodiment, the flow control means includes an actuator electrically connected to means for pumping the fluid from said fluid source, such as a prelubrication pump used in a diesel or internal combustion engine. In this embodiment, the flow control actuator includes disconnectable electrical connection means for control of the pump means.

In a second preferred embodiment, the flow control means comprises a pump for pumping the fluid from the fluid source through the conduit. The actuator includes electrical means such as a battery pack or connections to an external source of power such as an electrical wall outlet or battery on vehicle or equipment. The electrical connection is similar to the first embodiment in which disconnectable electric connectors are used. In the case of the battery pack or portable power source, the preferred pump is a lightweight dc-motor or ac-motor driven pump in which a small lightweight rechargeable battery pack is mounted as part of the flow control means. The pump may be portable or handheld.

In another embodiment of the invention, a conduit having a female or male coupling is used to connect an air gun or supply source of air pressure. The conduit includes a fitting in the line between the prelubrication pump and the system filter. This is preferably used prior to the removal of oil from the system to clear oil channels and at least some of the oil from the filter to simplify oil removal and make it safer for the workers.

In yet another embodiment of the invention, a flow controller includes a pump for pumping fluids selectively from a plurality of fluid reservoirs, such as the engine, hydraulic and/or transmission reservoirs. For three fluid reservoirs, for example, a three-position control valve selectively connects the pump to three conduits, which are in fluid communication with the engine, hydraulic and transmission sumps, respectively. The pump may be mounted on the engine or the vehicle or may be portable or even handheld.

Other embodiments include a first pump fluidically connected to the engine oil reservoir and a second pump fluidically connected to a plurality of other fluid reservoirs, such as a hydraulic and a transmission reservoir. Each of these pumps may be mounted on the engine or the vehicle or may also be portable or handheld.

In addition to the pumps that are mounted on the vehicle or engine, external pumps may also be used as apart of a comprehensive system of fluid service. An external pump may be, for example, an evacuation pump on a lubrication service truck or "lube truck" or another external, pump that may be located either on the lube truck or on an independent portable conduit and dedicated, for example, to supplying new replacement oil to the engine and equipped with a pressure regulator valve.

While the present invention facilitates the removal of fluid from machines, engines, hydraulic systems and the like, other advantages of the invention will become apparent from a perusal of the following detailed description of presently preferred embodiments of the invention taken in connection with the accompanying drawings.

BRIEF DESCRIPTIONS OF THE DRAWINGS

DETAILED DESCRIPTION OF THE INVENTION

Figure 1:
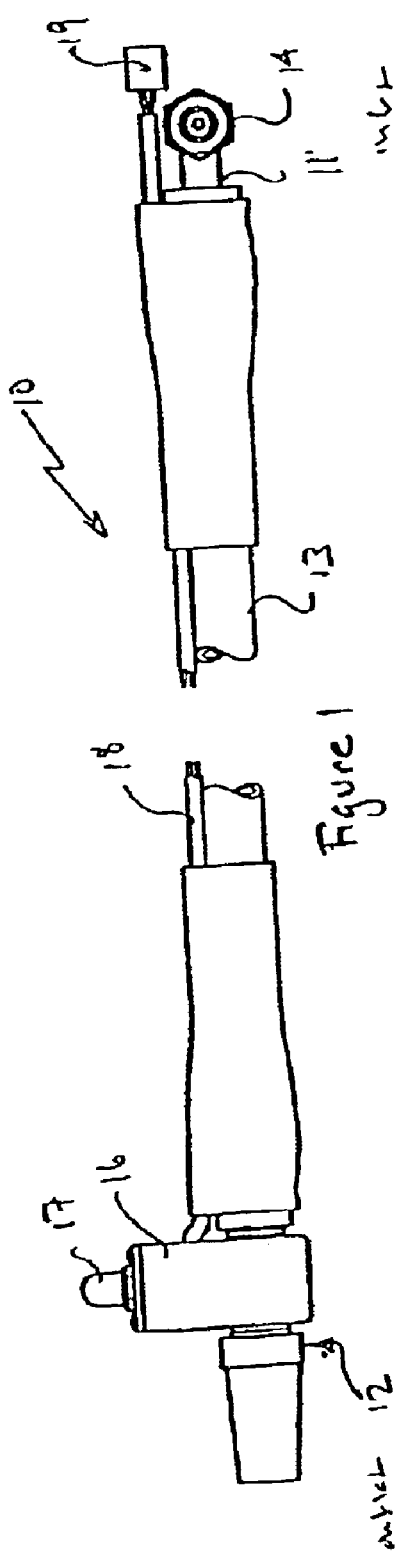
FIG. 1 is a side elevation of an embodiment of a single-reservoir conduit system of the present invention.
Figure 2:
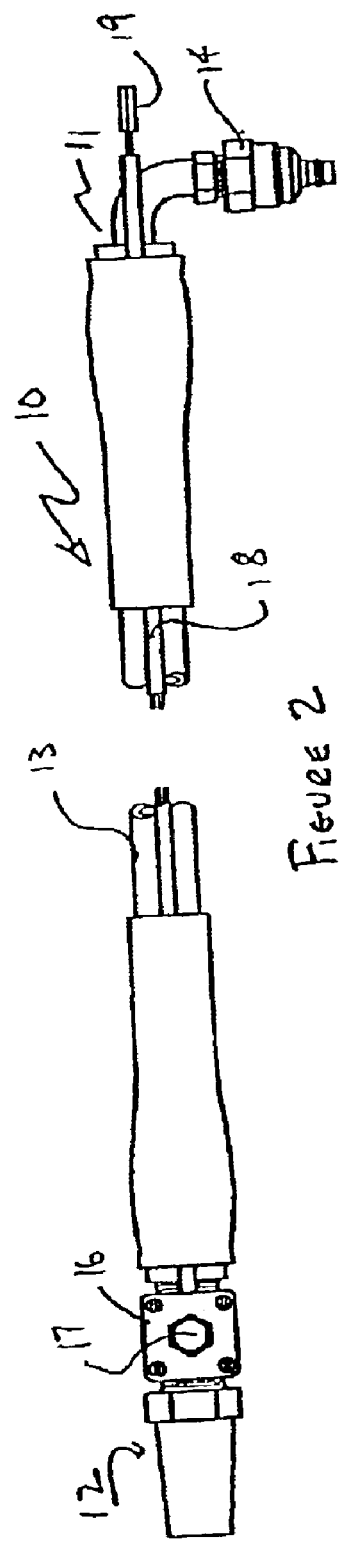
FIG. 2 is a plan view of the embodiment shown in FIG. 1 showing a coupling.

Referring to FIGS. 1 and 2, there is shown a portable fluid transfer conduit 10 having an inlet port 11 and outlet port 12. Flexibly extending between inlet and outlet ports 11 and 12 is flexible tubing 13. Tubing 13 is preferably made from a natural or synthetic rubber material, braided stainless steel or polymeric extruded material such as polyethylene or styrene.

A coupling 14 is attached to inlet 11. As shown, coupling 14 is the male mateable end of a quick disconnect coupling more clearly shown in FIGS. 5 and 6. Alternatively, coupling 14 can be any type of fitting such as a screw in or a bayonet type coupling. Preferably, however, a fitting is adapted to the outlet of the fluid source. On devices such as a prelubrication pump similar to that shown in U.S. Pat. No. 4,502,431, a bypass or connector means is easily inserted on the pressure side of the pump to divert the oil from the engine to the fluid transfer conduit 10. An example is disclosed relative to FIGS. 5 and 6 below.

Positioned adjacent outlet port 12 is flow control means 16. Flow control means comprises in one embodiment an electric or mechanical valve for controlling the flow of fluid through the conduit activated by switch 17. This embodiment is useful where the fluid source does not incorporate a pump means and/or the fluid is gravity transferred. On the other hand, in the case where means such as a prelubrication device is used, flow control means 16 is preferably a pass through conduit having switch 17 sealably mounted thereon. Switch 17 is electrically connected by conductor 18 to electrical connector 19, which is adapted to connect with the pump circuit to activate the pump and control the flow of fluid. Where flow control means 16 comprises an electric valve, conductor 18 and connector 19 are typically connected to a source of electrical power such as a battery terminal, a magnetic switch, relay contacts or other electro-mechanical means for activating the pumping means.

To drain a fluid such as oil or hydraulic oil from a piece of equipment is a simple matter of connecting coupling 14 to the outlet of the pump and initiating the pump through activation of flow control switch 17 or gravity flow. It should be noted that where a prelubrication pump is used, such as in U.S. Pat. No. 4,502,431 a valve is not required. The outlet port of fluid transfer conduit 10 is positioned at a remote and convenient location to discharge the fluid into a waste oil-receiving receptacle. Such waste oil-receiving receptacles are known in the art and may commonly comprise barrels or service vehicles adapted to receive and transport waste oil or other contaminated vehicle fluids.

Figure 3:
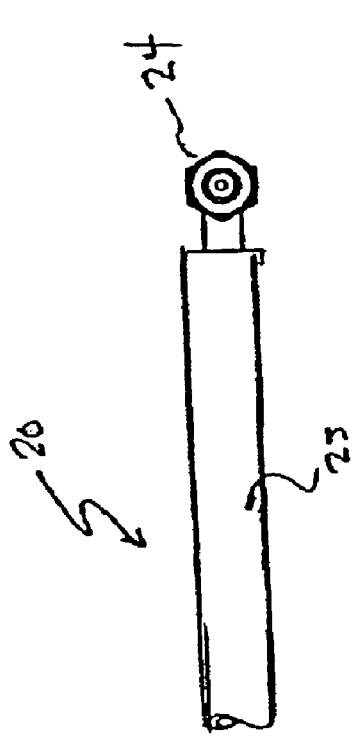
FIG. 3 is a plan view of another embodiment of the invention having a pump integrally included in the flow control means.
Figure 4:
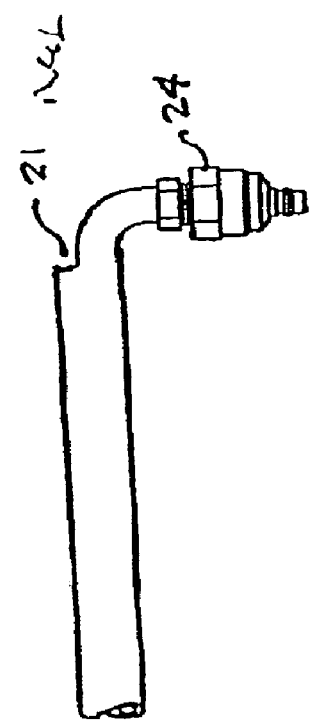
FIG. 4 is a side elevation of the embodiment shown in FIG. 3.
Figure 5:
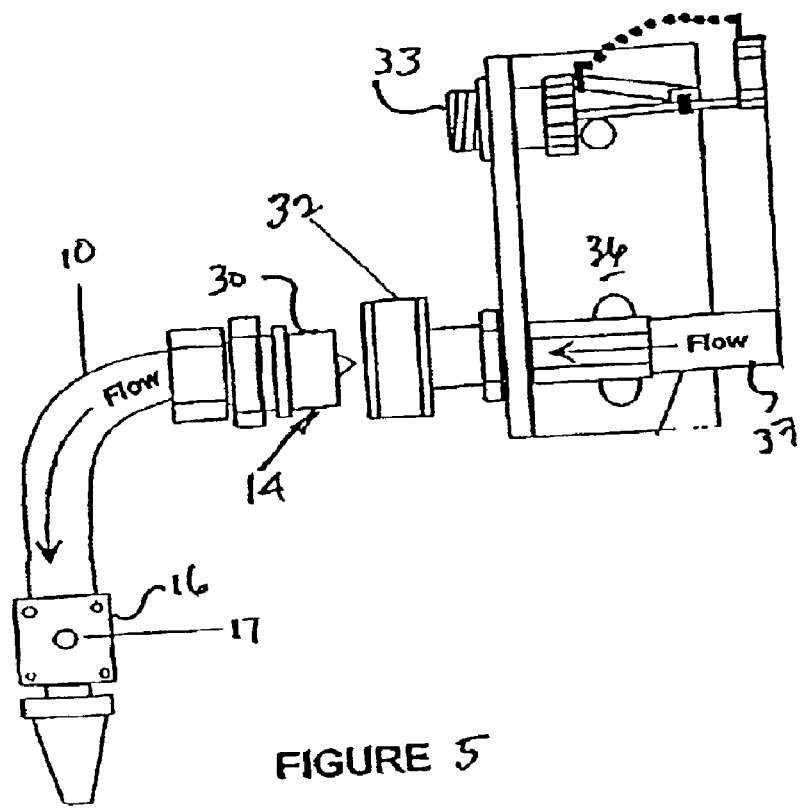
FIGS. 5 and 6 are two views of a coupling for use with the present invention.
Figure 6:
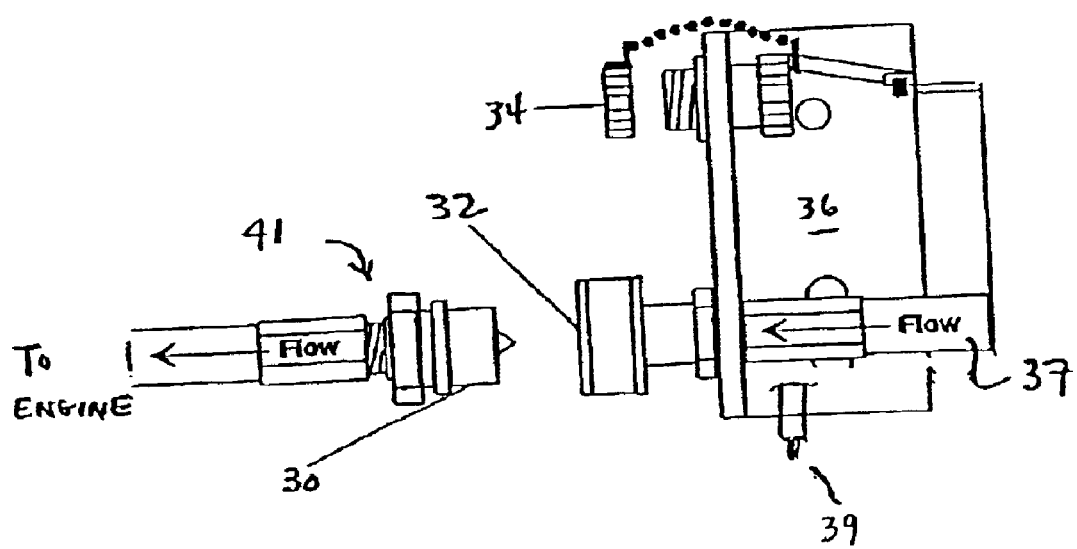

In another preferred embodiment shown in FIGS. 3 and 4, fluid transfer conduit 20 comprises a conduit 23 having an inlet port 21 and an outlet port 22. Inlet port 21 includes a coupling 24, preferably a mateable coupling as shown in FIGS. 5 and 6. In this embodiment, flow control means 26 comprises a small suction, diaphragm, piston or reciprocating pump 28 preferably including a battery pack within. Flow control means 16 includes activator switch 27 preferably in the form of a "trigger switch" having guard 29 and grip means 31 to facilitate holding the discharge end of fluid transfer conduit 20. It should be noted, however, that where a long transfer conduit is contemplated, for example 20 to 30 feet in length, it is desirable to locate the pump adjacent or in close proximity to coupling means 14.

Many types of small portable pumps 28 are commercially available on the market. A number of pumps are better suited for heavier or more viscose fluids but are not capable of being run with battery power. In such cases, a power cable such as conductor 18 and connector 19 can be used in this embodiment as well. Typically, the electrical power required can be supplied by a vehicle storage battery or an a-c pump can be connected to an a-c outlet.

The smaller pump means are especially useful in the consumer market and the larger pumps are especially applicable to the industrial market.

Referring to FIGS. 5 and 6 an example of a preferred coupling means 14 and 41 are respectively shown. Coupling means 14 and 41 are adaptable to both fluid transfer conduit embodiments shown with respect to FIGS. 1 and 3. Coupling 41 connects to the engine oil port (not shown) whereas coupling 14 is attached to conduit 10. Such couplings are well known in the art and comprise a male quick connector fitting 30 and a female mateable quick connector fitting 32. Also shown is an electrical receptor 33 for receiving electrical connector 19. It is also possible to include a sensing means on the coupling to indicate that the sump is dry and signal for shut down of the pump. A cap 34 is shown for protecting receptor 33 between periods of use. As shown in FIGS. 5 and 6, receptor 33 and fitting 32 are mounted on a bracket 36 which is then connected to a source of fluid 37, such as a prelubrication pump, not otherwise shown. In this embodiment, fitting 32 is connected in the output or high pressure side of the fluid source system. In the case of a prelubrication system, fitting 32 is interposed in the high pressure pump discharge line between pump and an engine.

As shown in FIG. 6 is a sampling port 39 can be used to sample oil in a prelubrication system where the prelubrication pumps flows in to 37. This has the advantage of providing a live sample of oil without requiring the engine to be running.

Figure 7:
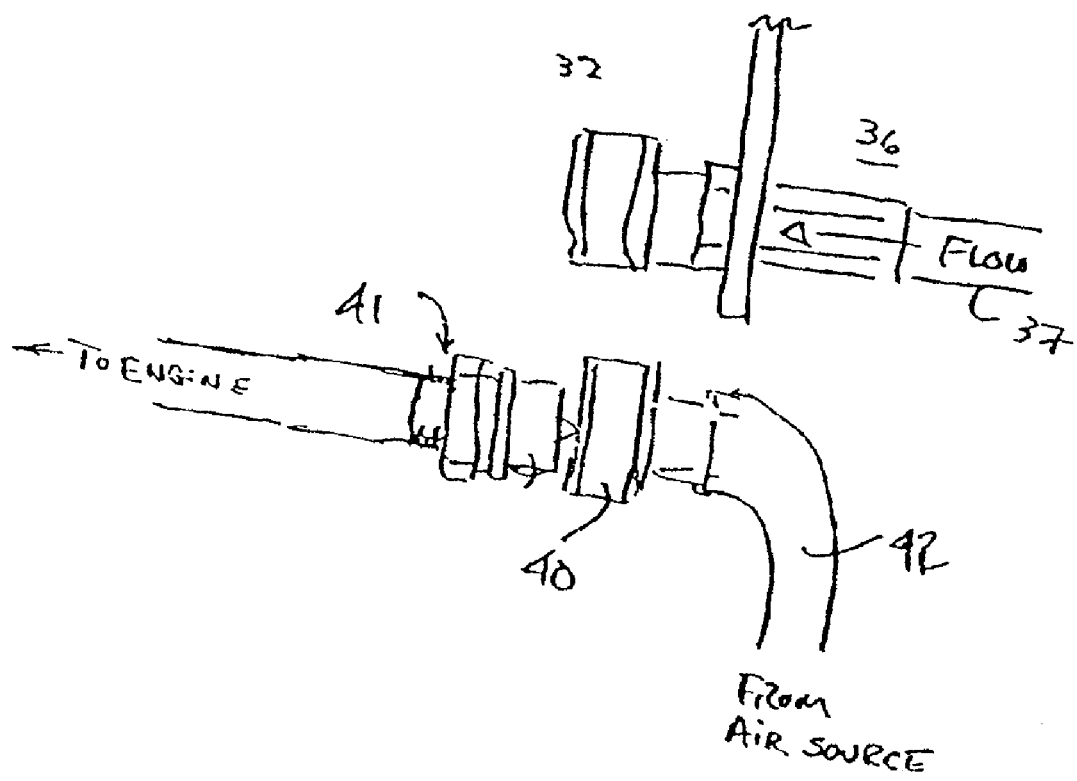
FIG. 7 is diagrammatic view of a conduit, and a coupling for oil purges.

As shown in FIG. 7, an additional fitting 40 is attached to an external air supply 42. Preferably fitting 40 is a female fitting adapted to a couple to air supply (not shown). By attaching an air source to fitting 40 prior to or during the removal of oil from the engine, oil resident in the channels can be removed to the sump and the oil in the filter system at least partially removed to facilitate removal of the filter, especially if it is hot. Typically, it is desirable to have the source of air at a pressure from about 90 to 150 psi.

I have found that a vehicle or other equipment having, for example, an engine reservoir 105, hydraulic fluid reservoir 107 and a transmission fluid reservoir 109, may be more efficiently serviced and the risks of environmental contamination reduced if the service locations for such fluids are in relatively close proximity to one another. For example, and without limitation, if the service locations for such reservoirs are within about 3–10 feet from one another, service can be accomplished by a single technician and in much shorter times. Also, the risks from environmental contamination caused, for example, by spillage when several lines and fluid containers are disconnected and connected, can be greatly reduced if a unitary service location is provided.

Figure 8:
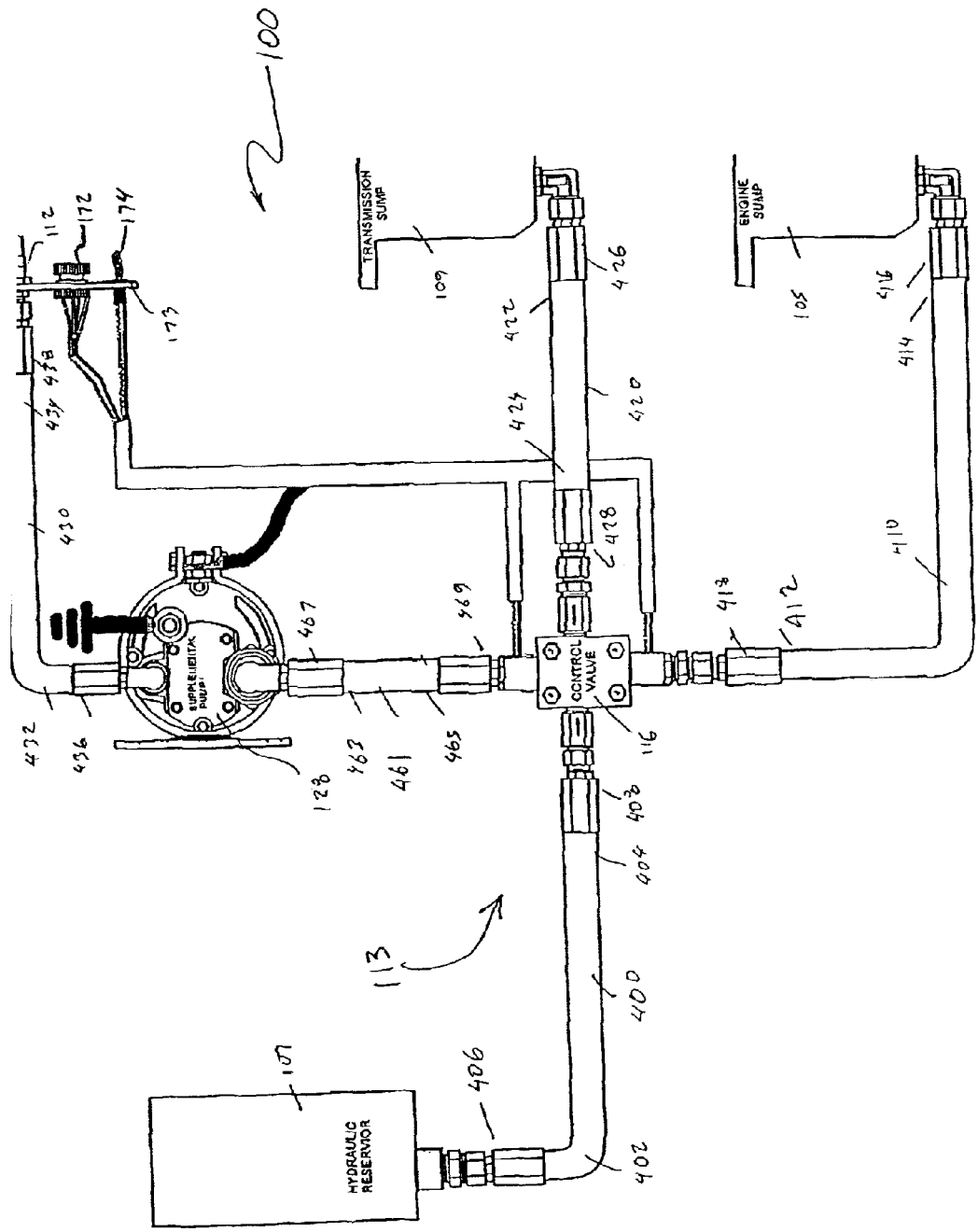
FIG. 8 is a diagrammatic view of an embodiment of a multiple-reservoir conduit system.

FIG. 8 illustrates one embodiment for a single-pump multiple reservoir conduit system 100, which may be used, for example, to quickly evacuate the engine reservoir 105, the hydraulic reservoir 107 and the transmission or other fluid reservoir 109 of a machine, vehicle or other apparatus through a quick connect port 112 that may be mounted on a bracket 173 or to an evacuation port 153 in a control panel 150, discussed below. A pump 128, and each of the reservoirs 105, 107 and 109 are connected to a control valve 116 through a network of conduits 113. The pump 128 may be a dedicated evacuation pump, or it may alternatively be, for example, an engine prelubrication pump. The network of conduits includes a first conduit 400 connected to the hydraulic reservoir 107 at a first end 402 by a first coupling 406, and to the control valve 116 at a second end 404 by a second coupling 408. Similarly, a second conduit 410 is connected at a first end 414 to the engine reservoir 105 by a first coupling 416, and to the control valve 116 at a second end 412 by a second coupling 418. A third conduit 420 is connected at a first end 422 to the transmission reservoir 109 by a first coupling 426, and to the control valve 116 at a second end 424 by a second coupling 428. A fourth conduit 430 is connected to the pump 128 at a first end 432 by a first coupling 436 and to the outlet port 112 at a second end 434 by a second coupling 438. A fifth conduit 461 is connected to the pump 128 at a first end 463 by a first coupling 467 and to the control valve 116 at a second end 465 by a second coupling 469.

The control valve 116 is preferably a three-position, four-port directional valve, which controls the connection of the pump 128 with each of the conduits 410, 400 and 420 leading to the reservoirs 105, 107 and 109, respectively. The control valve 116 has one default position which, preferably is the engine sump 105 position. The control valve 116 and the pump 128 may be operated from a remote bracket 173 by an electrical evacuator switch attached, for example, to a connector 172, and a toggle selector switch 174, respectively.

As will be appreciated, in the operation of the system of FIG. 8, the control valve 116 determines which of the reservoirs 105, 107 or 109 will be in fluid communication with the pump 128 through the conduit network 113. Specifically, the selector switch 174 determines the position of the control valve 116. The switch connected at connector 172 serves as the on-off switch for the pump 128, and may be mounted on the bracket 173 or may be mounted on a tethered switch connected to connector 172.

In operation, the selector switch 174 controls the position of the control valve 116 to determine which reservoir 105, 107 or 109 will be evacuated. When the switch connected to connector 172 is energized, the pump 128 is energized, thereby providing negative pressure on line 461 and, thereby, to the control valve 16. The fluid in the reservoir 105, 107 or 109 fluidly coupled to the control valve 116 will be drawn into line 461, through pump 128, through line 430 and to coupling 112 for discharge into a suitable receptacle or into a fluid line.

Figure 9:
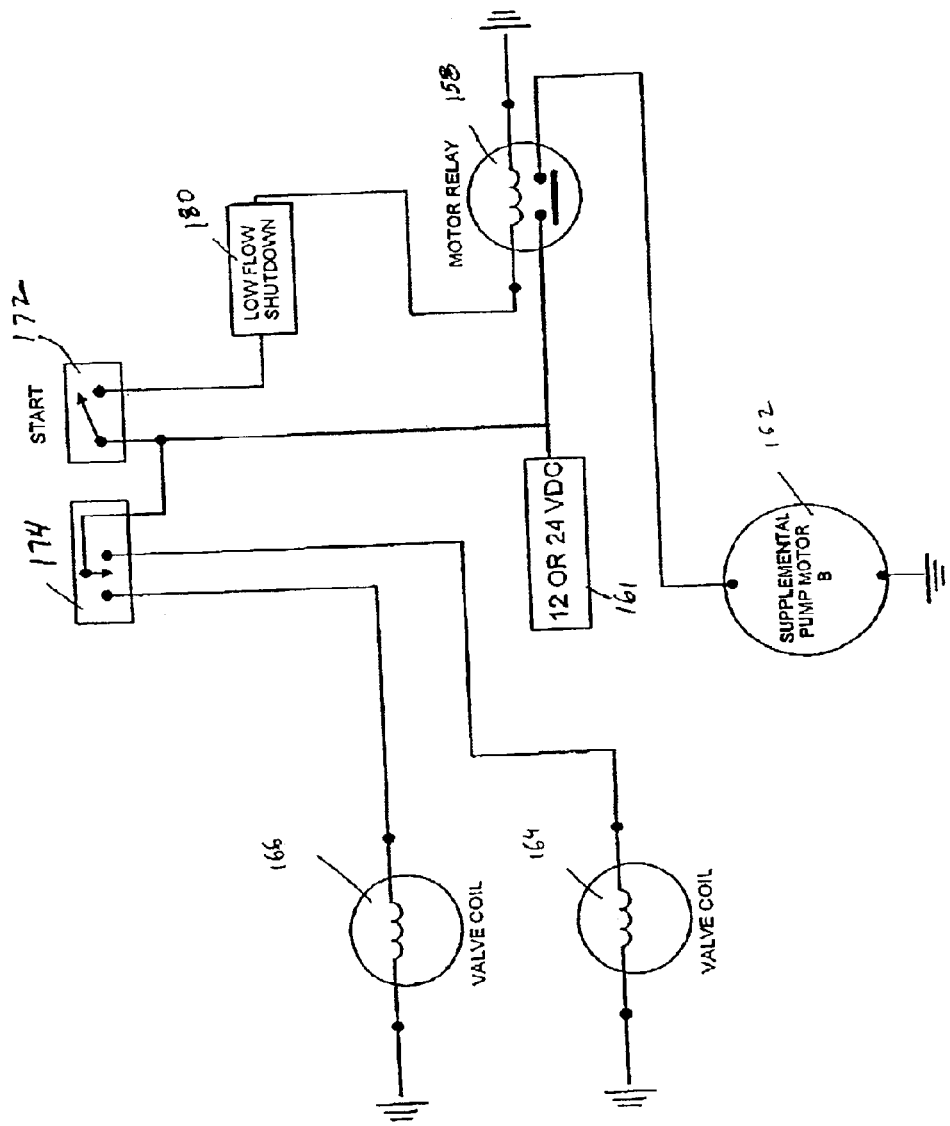
FIG. 9 is an electrical schematic diagram of the system of FIG. 8.

FIG. 9 shows an exemplary diagram of the electrical circuitry for an embodiment of the single-pump, multiple reservoir system of FIG. 8. A relay switch 158 is connected to the motor 162 of the pump 128 to start and stop the pump motor 162 when the start switch connected at 172 is activated to provide power from a direct current source. The relay switch 158 stops the motor when a low flow condition is detected in the any conduits 400, 410, and 420 during evacuation by sensor 180. The control valve 116 is electrically operated through two solenoids 164 and 166 connected to a selector switch 174, which is connected to the start switch connected at 172. The start switch connected at 172 is preferably a single pole, normally open switch, and the selector switch 174 is preferably single pole double throw switch.

Although three reservoirs are shown in FIG. 8, the number of reservoirs is not limited to three. For embodiments with N reservoirs, for example, there are N reservoir conduits connecting each reservoir with the control valve, such as the conduits 400, 410 and 420 of FIG. 8. A pump conduit, such as conduit 461, connects the control valve 116 to the pump 128, and an outlet conduit, such as conduit 430, connects the pump 128 to the outlet port 112. For N reservoirs, the control valve 116 has one default position and N−1 selector activated positions.

Figure 10:
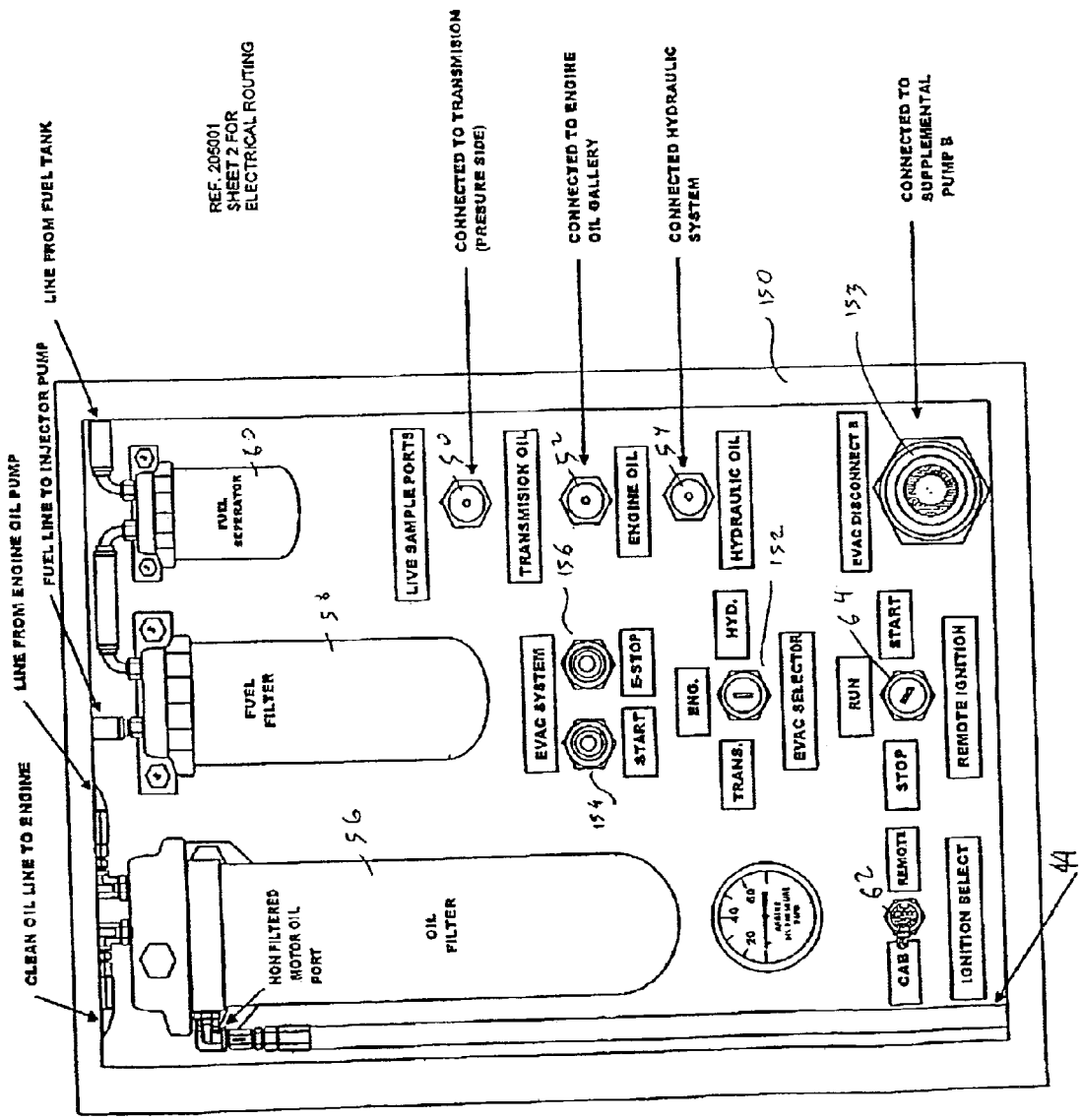
FIG. 10 is an elevational view of a service panel for a fluid evacuation system.

The control valve 116 may also be operated from a centralized location, such as a service panel. An embodiment of a remote single service panel 150 for a single pump, which includes switches for the actuation of the pump 128 and the control valve 116 in addition to switches for ignition and ports for sampling engine, transmission and hydraulic fluids, is shown in FIG. 10. A selector switch 152 on the service panel 150 is instead connected to the control valve 116 to enable an operator to select the reservoir to be evacuated. A switch for controlling evacuation 154, an emergency evacuation stop switch 156, and an evacuation connect port 153 (coupled, for example, to the line 430) for connecting/disconnecting the pump 128 may also be mounted on the service panel 150. Additionally, a transmission oil sampling port 50, an engine oil sampling port 52, and a hydraulic oil sampling port 54 may be mounted on the service panel 150 for with the transmission, engine and hydraulic reservoirs respectively. The service panel 150 may also include an oil filter 56 having an oil inlet line 44, transmission oil filter, a fuel filter 58, a fuel separator 60, hydraulic oil filter, a remote ignition selector 62 and an ignition switch 64. It should be appreciated, however, that the service panel need not be a full service panel, and it may only include the evacuation system switches. Thus, service locations, such as control panel 150, may be provided for virtually all vehicle or engine fluid service needs.

Figure 11:
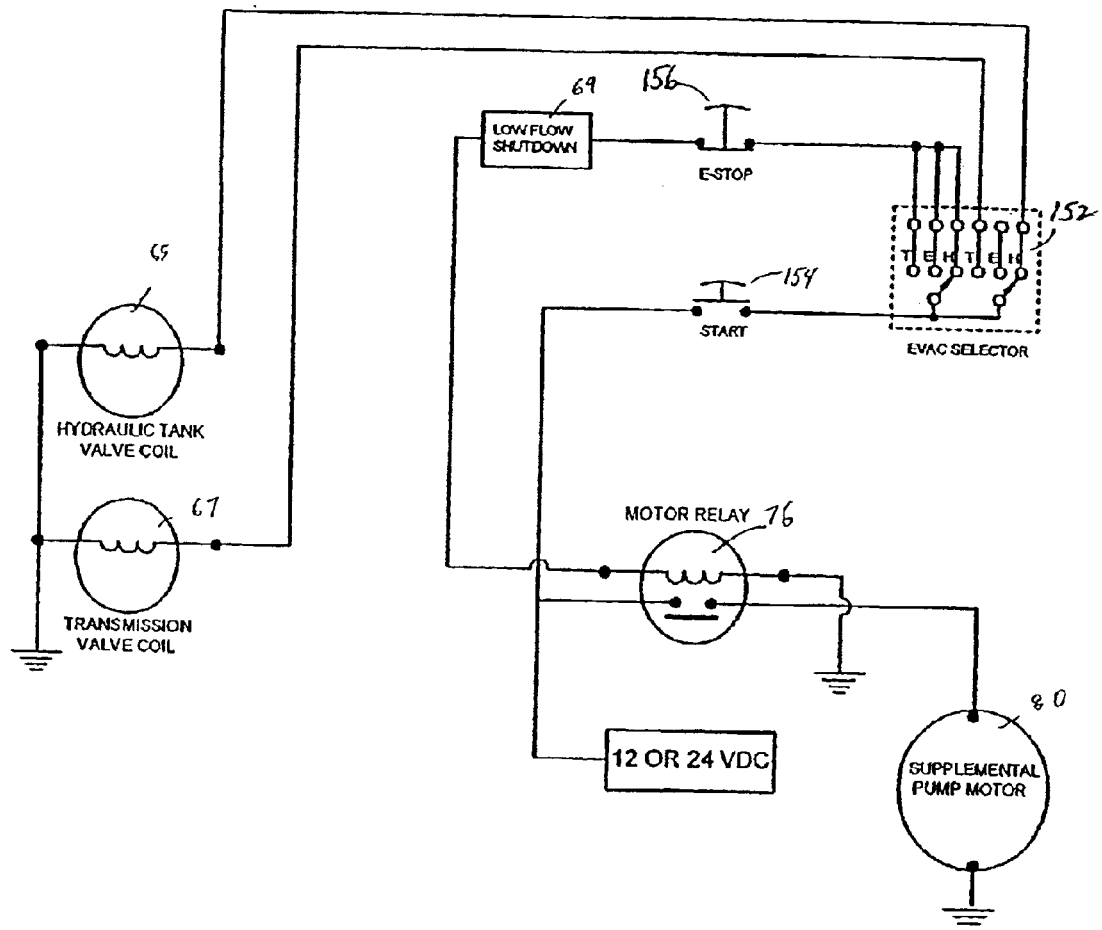
FIG. 11 is an electrical schematic view of the system of FIG. 10.

An embodiment of the electrical diagram for the service panel of FIG. 10 is shown in FIG. 11. A motor relay 76 is connected to the pump motor 80 connected to pump 128 to start and stop the pump motor 80 when the start 154 and emergency stop 156 switches, respectively, are operated. The relay switch 76 stops the motor when a low flow condition is detected by sensor 69 during evacuation. The evacuation selector switch 152, which is electrically connected to the start switch 154 and the and emergency stop switch 156, enables the selective evacuation of the hydraulic reservoir 107 or transmission reservoir 109 through the operation of a hydraulic reservoir solenoid valve coil 65 and a transmission reservoir solenoid valve coil 67, respectively. The default position in this Figure is the evacuation of the engine reservoir 105, but it will be appreciated that any of the reservoirs may be chosen as the default position, and that the number of reservoirs may not be limited to three.

Figure 12:
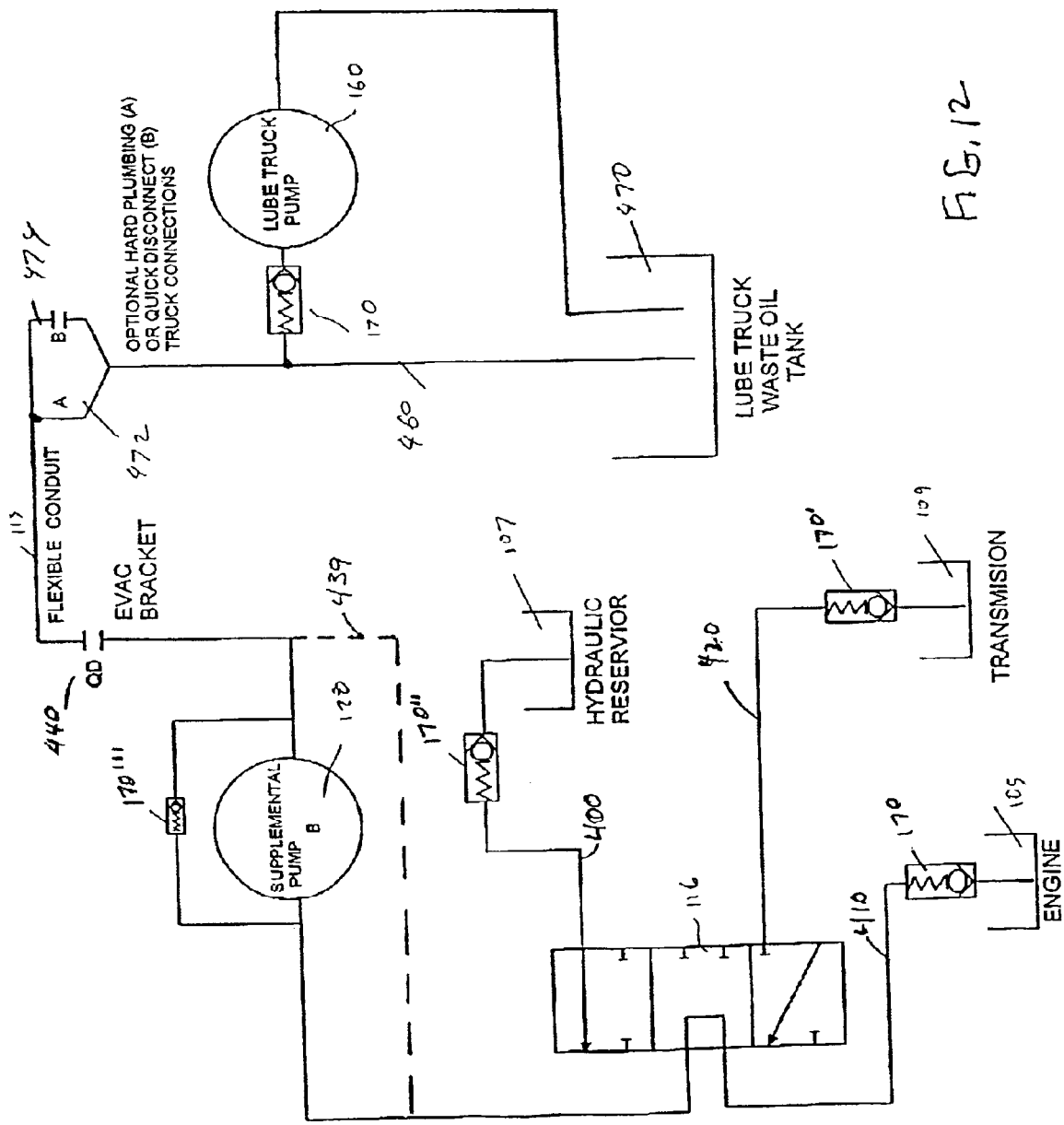
FIG. 12 is a hydraulic schematic diagram of a fluid evacuation system.

As shown in FIG. 12, each of the lines 410, 420 and 400 may also be coupled to a corresponding check valve 170, 170' or 170", respectively, to allow flow in one direction only as well as a check valve 170''' around pump 128. Optionally, a line 439 (shown in dotted lines in FIG. 11) may be provided with appropriate valving around the pump 128 which is connected to a quick disconnect coupling 440. In that case, the truck pump 160 of a lubrication evacuation truck may be used to evacuate fluids. The truck pump 160 evacuates through permanent line 472 or quick disconnect line 474 to a truck waste tank 470. If pump 128 is used and the truck pump 160 is not used, a conduit 460 may be connected via appropriate valving through the hard plumbing 472 or quick disconnect 474 to the lubrication truck waste tank 470.

Figure 15:
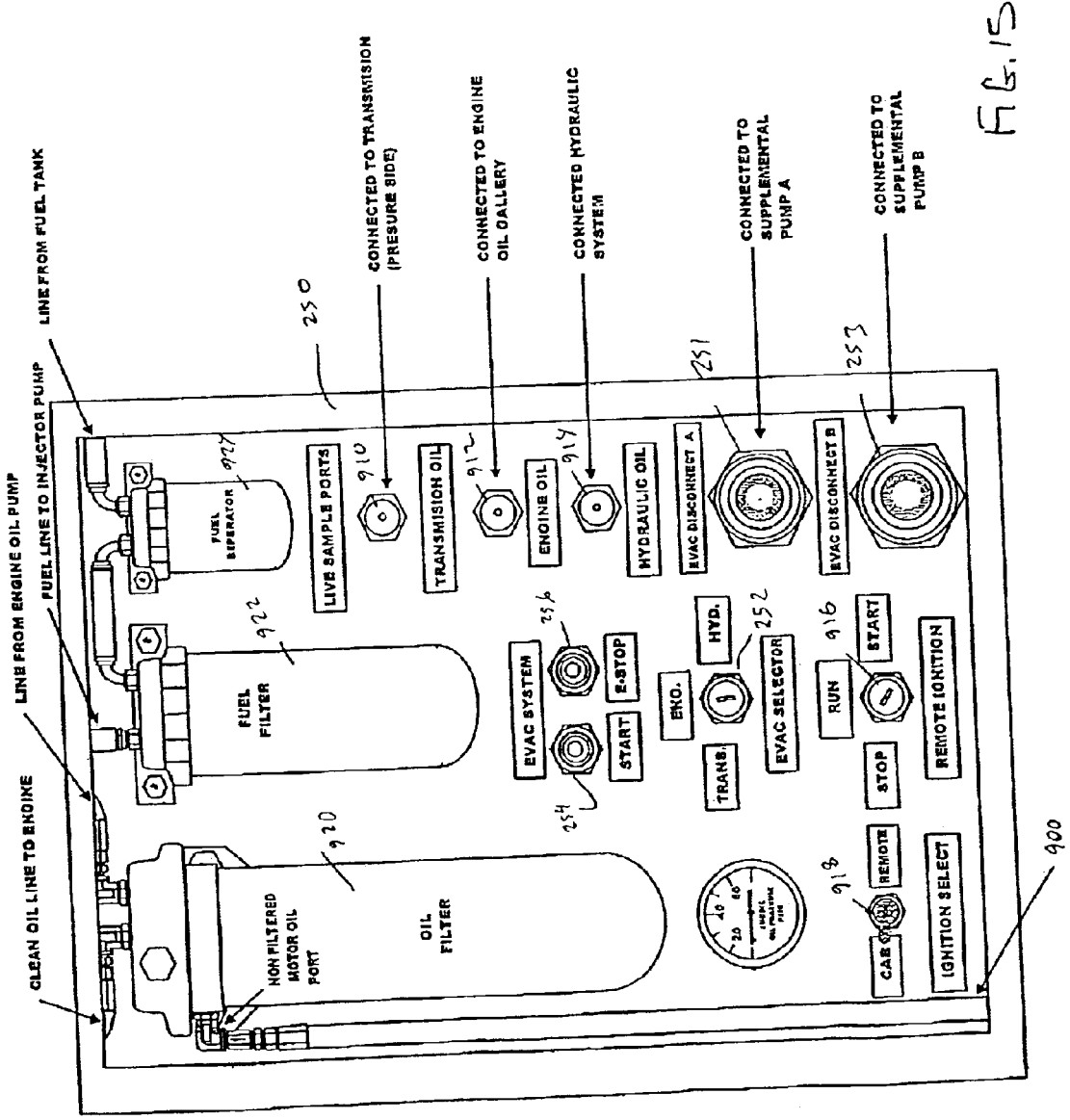
FIG. 15 is an elevation view of another control panel for a fluid evacuation system.
Figure 16:
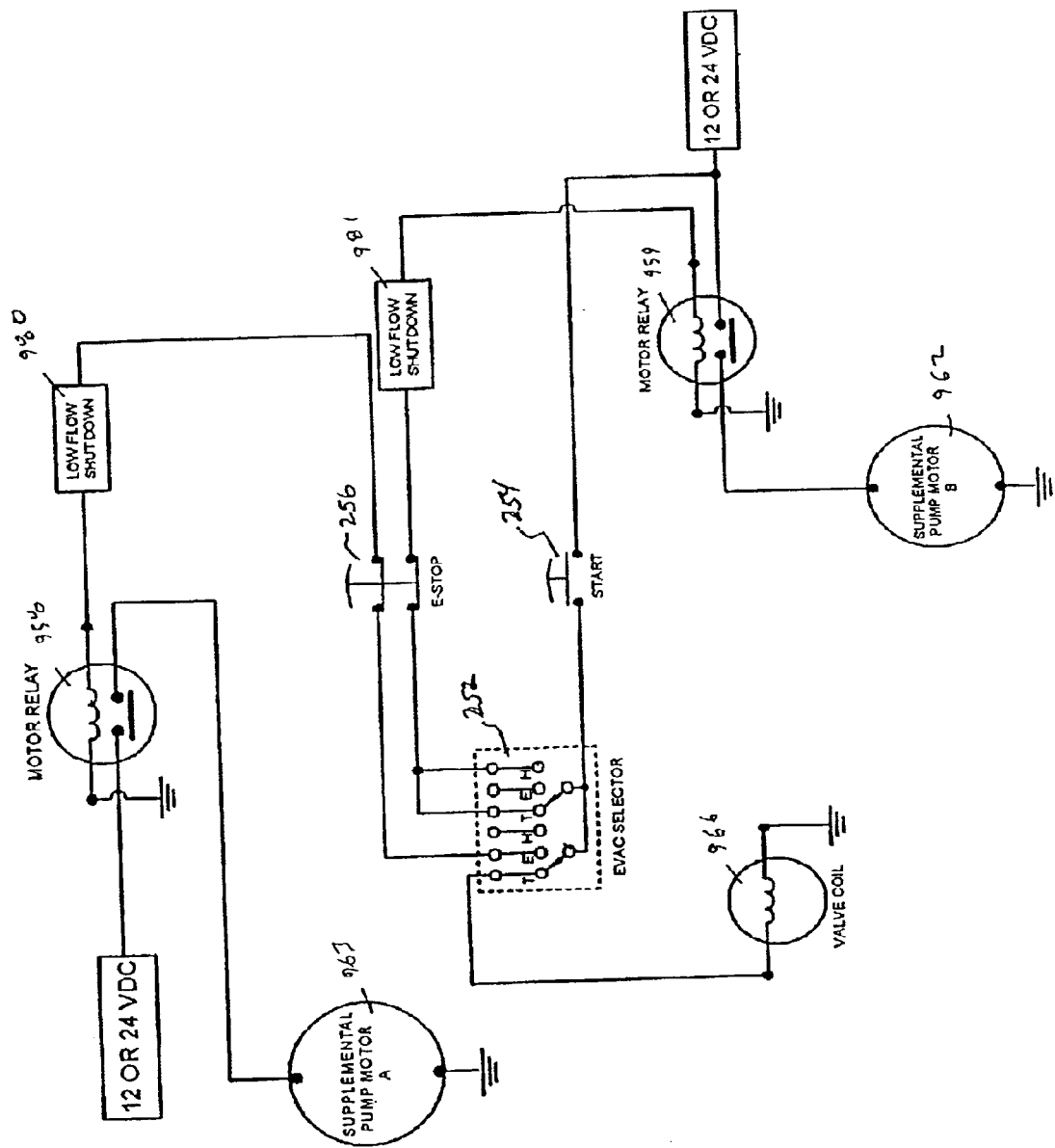
FIG. 16 is an electrical diagram of the system of FIG. 15.
Figure 17:
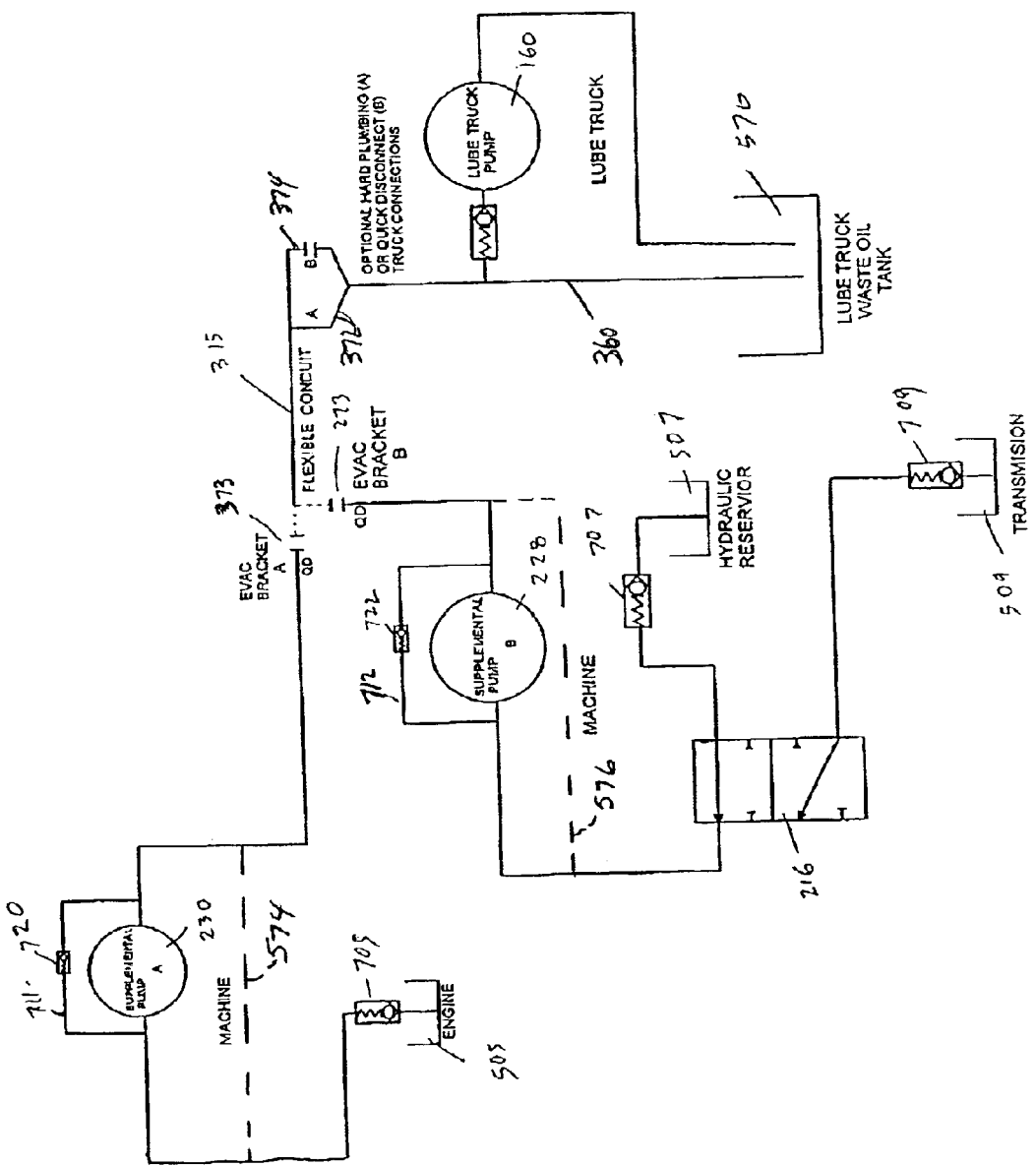
FIG. 17 is a hydraulic schematic diagram of a multiple pump fluid evacuation system.

FIGS. 13–17 illustrate embodiments for a dual-pump multiple reservoir conduit system 200 including a first pump 230 in fluid communication with an engine reservoir 505, and a second pump 228 in fluid communication with a hydraulic reservoir 507 and a transmission reservoir 509. However, it will be appreciated that more pumps may be used or the pumps may be connected to different reservoirs within the spirit and scope of the invention. In this embodiment, the first pump 230 evacuates the engine oil through a first outlet port 312 operated with an electrical switch connected to a connector 372 on a remote bracket 373 or mounted on a service panel 250. A first conduit 520 is connected to the engine reservoir 505 at a first end 522 by a first coupling 524, and to the first pump 230 at a second end 526 by a second coupling 528. A second conduit 530 is connected at a first end 532 to the first pump 230 by a first coupling 534, and to the first outlet port 312 at a second end 536 by a second coupling 538. The outlet port 312 may be connected to a conduit to provide for prelubrication of the engine. Alternatively, the second conduit 530 may also be fluidically connected to a coupling 251 in a control panel 250, discussed below. The second pump 228 is connected to a control valve 616 and evacuates fluid from the transmission reservoir 509 or the hydraulic reservoir 407 to a second outlet port 212 by operating the selector switch 274 and an evacuation switch connected to connector 272 which, together with the outlet port 212, may be mounted on a second bracket 273. The second pump 228 and each of the reservoirs 507, 509 are connected to a control valve 616 through of a network of conduits 513. The network of conduits 513 includes a first network conduit 540, which is connected at a first end 542 to the hydraulic reservoir 507 by a first coupling 546, and to the control valve 616 at a second end 544 by a second coupling 548. A second network conduit 550 is connected at a first end 554 to the transmission reservoir 509 by a first coupling 558, and to the valve 616 at a second end 552 by a second coupling 556. A third network conduit 580 is connected to the pump 228 at a first end 582 by a first coupling 586 and to the outlet port 212 at a second end 584 by a second quick coupling 588. Alternatively, the conduit 580 may be fluidically connected to a coupling 253 on the control panel 250. A fourth network conduit 590 is connected to the second pump 228 at a first end 592 by a first coupling 596 and to the control valve 616 at a second end 594 by a second quick coupling 598. A flexible conduit 315 may be used connect the outlet ports 312 or 212 to a waste oil container or to a port of a lubrication truck leading to a waste oil tank 570 on the lube truck, as shown in FIG. 17. The control valve 616 provides for the selective evacuation of the transmission 509 or hydraulic reservoir 507.

Figure 13:
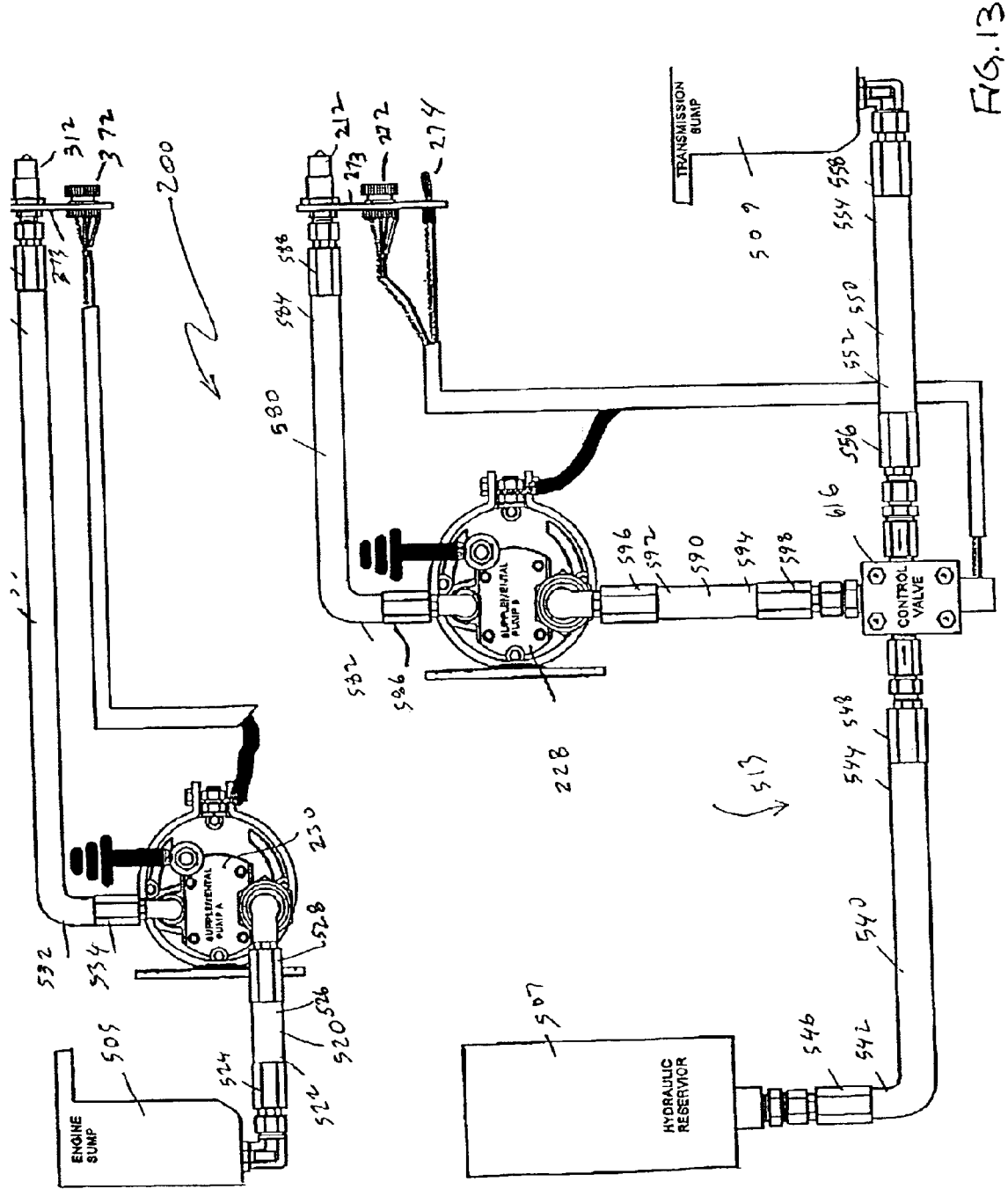
FIG. 13 is a diagrammatic view of an embodiment of a dual-pump multiple-reservoir conduit system.
Figure 14:
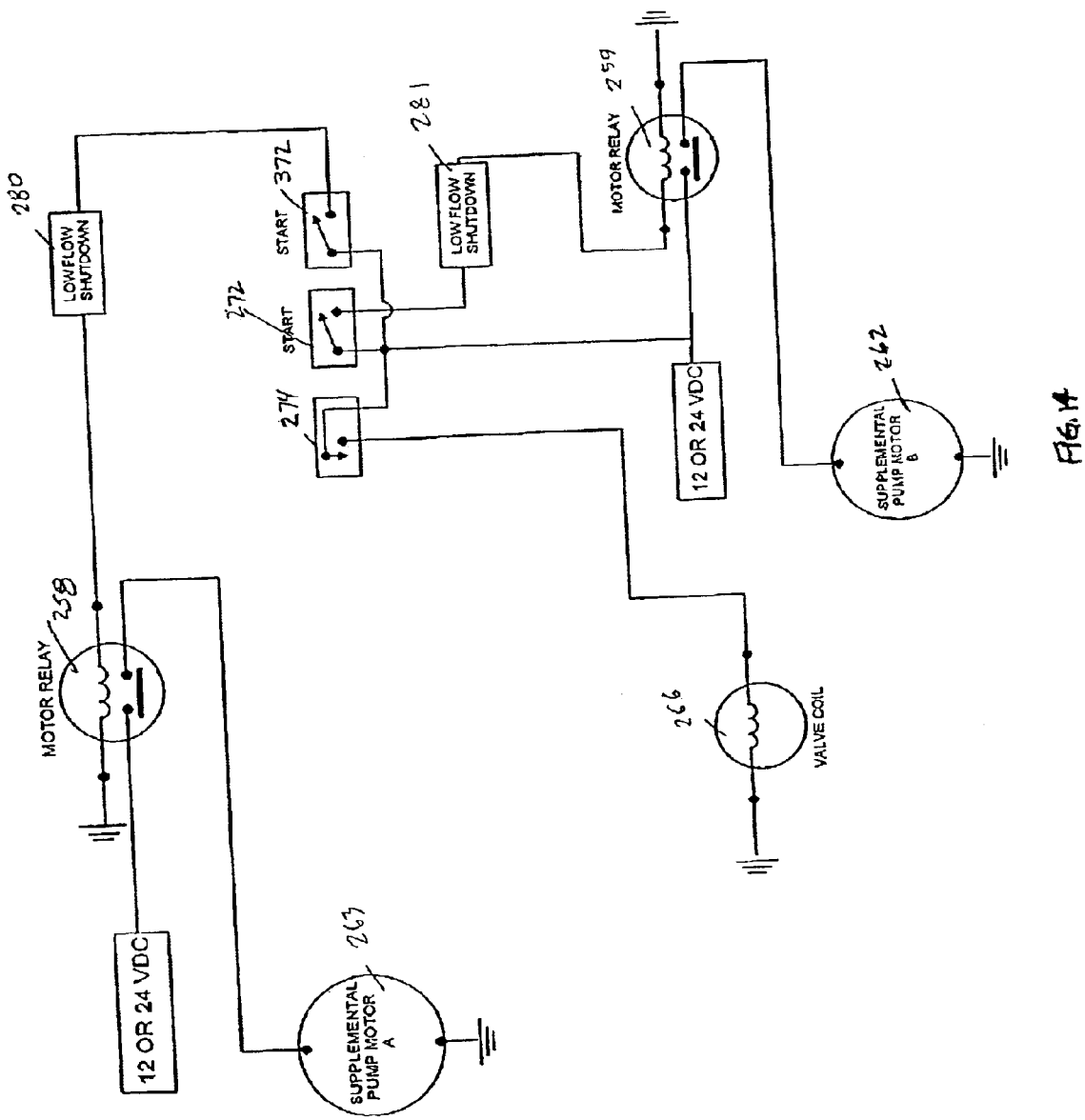
FIG. 14 is an electrical schematic diagram of the system of FIG. 13.

FIG. 14 illustrates an electrical diagram for an embodiment of a dual-pump multiple reservoir evacuation system illustrated in FIG. 13. Each pump motor 263 and 262 is connected to a corresponding relay switch 258 and 259, and each relay switch is powered, for example, by a portable source of 12V or 24V DC current. First and second motor relay switches 258, 259 are connected to a first and second normally open start switches 372 and 272. Between each relay and the corresponding start switch, low flow sensors 280 and 281, respectively, intervene to stop the corresponding motor when a low flow condition is detected. A source of electric current is connected to the second relay switch 259, to the selector switch 274 and to the start switch 372 and 272. A two-position control valve 216 controls flow to the hydraulic reservoir 507 and the transmission reservoir 509, and is shown with a hydraulic reservoir as the default position, although any of the reservoirs may be the default reservoir.

It will be appreciated that the number of conduits connected to the first and second pumps need not be limited to a total of three. For example, the first pump 230 may be connected to $N_1$ reservoirs and the second pump 228 may be connected to $N_2$ reservoirs for a total number of $$N=N_1+N_2.$$

FIG. 13 illustrates a first example of an embodiment where $N_1$ is equal to 1 and $N_2$ is equal to 2. In a second example of the same embodiment, $N_1$ is still equal to 1, but $N_2$ is a number greater that 2. In the second example, the control valve 616 is connected to $N_2$ reservoir conduits, such as conduits 540 and 550. In both examples, the second pump is connected to the control valve 616 with pump conduit 590, and to the second outlet 212 with outlet conduit 580.

An embodiment for a remote service panel 250 including controls for a dual-pump multiple reservoir evacuation system is shown in FIG. 15. It includes start 254 and stop 256 switches, a selector switch 252 and evacuation disconnect ports 251, 253 for the first pump 230 and second pump 228. A line 900 connected to the unfiltered side of the engine oil filter head may also be connected to a pressure-regulated air supply to purge the engine of used oil before adding replacement oil through the same port. On the same service panel sample ports 910, 912, 914 for the transmission, engine and hydraulic fluid reservoirs respectively may be mounted, as well as a remote ignition selector 918 and a remote ignition switch 916.

An embodiment of an electrical diagram for the panel of FIG. 15 is shown in FIG. 16. The pump motors 963 and 962 for the pumps 230 and 228, respectively, are connected to corresponding relay switches 958 and 959, respectively, and each relay switch is powered, for example, by a source of 12V or 24V DC current. The first and second motor relay switches 958, 959 are connected to the selector switch 252 and a normally closed emergency stop switch 256. Between each relay and the emergency stop switch 256, low flow sensors 280 and 281, respectively, intervene to stop the respective motor when a low flow condition is detected. The selector switch 252 is connected to a valve coil 966 and a normally open start switch 254. In FIG. 16 electrical wiring for the transmission reservoir is depicted in the selector switch 254, corresponding to contact points designated with the letter "T". For clarity, some wiring for the hydraulic and engine reservoirs, corresponding to contact points "H" and "E" of the selector switch 966 is omitted.

FIG. 17 illustrates a hydraulic diagram for an embodiment of a dual-pump multiple reservoir evacuation system. The first and second pumps 230 and 228 evacuate fluid from each of the selected reservoirs to ports 312 and 212, which may be mounted on brackets 373 and 273, respectively, or to the connectors 251 and 253 on the control panel 250. The flow from each reservoir 505, 507 and 509 may be controlled in one-way direction by check valves downstream from each reservoir. Check valves 705, 707 and 709 are connected downstream from the engine reservoir 505, the hydraulic reservoir 507 and the transmission reservoir 509 respectively. Check valves 720 and 722 are also mounted on bypass pipes 71 land 712, respectively, bypassing the first pump 230 and the second pump 228, respectively. A control valve 216, controls flow to the transmission reservoir 509 and to the hydraulic reservoir 507, and is shown with default position to the hydraulic reservoir 507. The discharge from bracket couplings 212 and 312 or control panel connectors 251 and 253 may be coupled to a discharge container or to a conduit 315 mounted on a lube truck. In that case, evacuated fluid passes through properly valved line 360 around lube truck pump 160 and directly into reservoir 570. Alternatively, it will be appreciated that the pumps 230 and 228 may be bypassed by lines 574 and 576, respectively, and appropriate valving provided in order that evacuation suction may be provided by the pump 160 on the lube truck. That discharge may then pass directly to the lube truck reservoir 570 via a fixed line 372 or a quick connection line 374.

Figure 18:
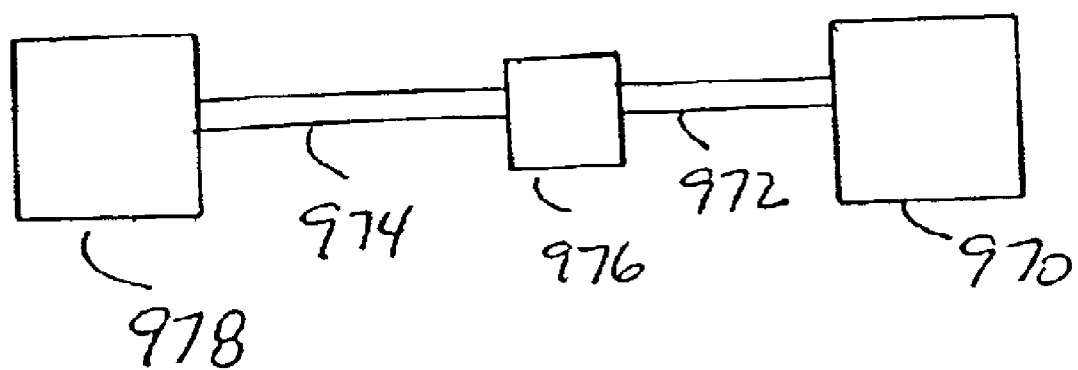
FIG. 18 is a schematic diagram showing a replacement fluid conduit system.

Either single-pump multiple reservoir system described in connection with FIGS. 8–12, or the dual-pump multiple reservoir described in connection with FIGS. 13–17 may be used to remove fluid from any of the reservoirs on a vehicle, by attaching evacuation conduits to the reservoirs as shown in the respective figures, operating the control valve to select a reservoir and actuating the pump to pump fluid from the selected reservoir to an outlet port for discharge. Additionally, after draining a selected reservoir, replacement fluid may be admitted into the appropriate cavity as shown schematically in FIG. 18, by attaching to a conduit 972 connected to the unfiltered side of the cavity's filter head 970 a replacement fluid conduit 974, by means of a coupling 976. The coupling 976 is connected to a replacement fluid source 978. For example, engine oil can be input into line 44 in the embodiment in FIG. 10 or into line 900 in the embodiment in FIG. 15, in each case before the oil filter head. It should be appreciated that the fluid cavities corresponding to the other reservoirs discussed herein can also be refilled by inputting replacement fluid on the unfiltered side of the respective filters of such fluid cavities.

The numerous advantages of the invention are manifested in the described embodiments, which include a versatile and flexible system and method for quickly evacuating any chosen reservoir on a vehicle. The evacuation rate may be as high as 90 gallons per minute, thereby considerably decreasing downtime and realizing significant economic benefits. The evacuation is performed in a controlled and targeted operation through direct conduits to the vehicle fluid system that minimize spilling and do not require removal of existing insulation shields. Furthermore, the invention may be used for either limited evacuation service or as a total fluid service system, which includes fluid evacuation, oil filter purging, and fluid replacement.

It should be appreciated that all the figures, and in particular the hydraulic and electrical diagrams of FIGS. 9, 11, 12, 14, 16, 17 and 18, are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A fluid transfer system for removing fluids from a plurality of reservoirs of different types of fluids on an engine powered apparatus, the system comprising:
   a pump;
   a common flow controller selectively controlling flow from the reservoirs of different types of fluids to the pump; and
   a network of conduits arranged to connect:
      each of said reservoirs of different types of fluids to the flow controller;
      the flow controller to the pump; and
      the pump to an outlet port for discharging fluid removed from a selected one of the reservoirs through the outlet port.

2. The system of claim 1, wherein the pump is mounted on the apparatus.

3. The system of claim 1, wherein the fluid reservoirs include engine, transmission and hydraulic fluid reservoirs.

4. The system of claim 1, further comprising flexible conduit coupled to the outlet port.

5. The system of claim 1, wherein the pump is mounted on a separate apparatus.

6. The system of claim 1, wherein the apparatus has a battery for supplying power to the pump.

7. The system of claim 1, wherein the pump is handheld.

8. The system of claim 1, wherein the pump is powered by alternating current supplied from a remote source of alternating current.

9. The system of claim 1, wherein the outlet port is discharged into a receptacle on a separate vehicle.

10. The system of claim 1, wherein the control valve is selectively actuated through an electrical switch.

11. The system of claim 10, wherein the electrical switch is mounted on a bracket adjacent the outlet port.

12. The system of claim 10, wherein the electrical switch is mounted on a service panel.

13. The system of claim 1, further comprising a fluid replacement system for at least one reservoir fluidically coupled thereto for permitting corresponding replacement fluid to be added to such reservoir fluidically in advance of a filter for such fluid.

14. A fluid transfer system for removing fluids from a plurality of reservoirs of different types of fluids on an engine powered apparatus, the system comprising:
   a pump;
   a common flow controller selectively controlling flow from the reservoirs of different types of fluids to the pump;
   a plurality of reservoir conduits coupling each of said reservoir of different types of fluids to the flow controller;
   a pump conduit coupling the flow controller to the pump; and
   an outlet conduit coupling the pump to an outlet port for discharging fluid removed from a selected one of the reservoirs through the outlet port.

15. The system of claim 14, wherein the pump is mounted on the apparatus.

16. The system of claim 14, further comprising a fluid replacement system for at least one reservoir fluidically coupled thereto for permitting corresponding replacement fluid to be added to such reservoir such that the replacement fluid flows through a corresponding filter prior to entering the reservoir.

17. A fluid transfer system for removing fluid from first, second and third reservoirs of different types of fluids on an engine powered apparatus, the system comprising:
   a first pump;
   a first network of conduits coupling the first reservoir to the first pump and the first pump to a first outlet port for discharging fluid removed from the first reservoir through said first outlet port;
   a second pump;
   a control valve selectively controlling flow from the second and third reservoirs to the second pump; and
   a second network of conduits coupling:
      each of the second and third reservoirs of different types of fluids to the control valve;
      the control valve to the second pump; and
      the second pump to a second outlet port for discharging fluids removed from a selected one of the second and third reservoirs through said second outlet port.

18. The system of claim 17, wherein the first and second pumps are mounted on the apparatus.

19. The system of claim 17 wherein the first pump is an engine prelubrication pump.

20. The system of claim 17, wherein the first reservoir comprises an engine oil reservoir, and the second and third reservoirs comprise transmission and hydraulic reservoirs, respectively.

21. The system of claim 17, further comprising first and second conduits coupled to the first and second outlet ports respectively.

22. The system of claim 17, wherein the first and second outlet ports discharge into at least one waste receiving receptacle.

23. The system of claim 17, wherein the apparatus has a battery for supplying power to the first and second pumps.

24. The system of claim 17, wherein the first pump is handheld.

25. The system of claim 17, wherein the second pump is handheld.

26. The system of claim 17, wherein the first pump is powered by alternating current supplied from a remote source of alternating current.

27. The system of claim 17, wherein at least one of the outlet ports discharges into a receptacle on a separate vehicle.

28. The system of claim 17, wherein the first pump is activated through a first electrical switch.

29. The system of claim 28, wherein the second pump is actuated through a second electrical switch.

30. The system of claim 29, wherein the first electrical switch is mounted on a first bracket.

31. The system of claim 30, wherein the second electrical switch is mounted on a second bracket.

32. The system of claim 29, wherein the first and second electrical switches are mounted on a service panel.

33. The system of claim 29 wherein the first and second outlet ports are mounted on a service panel.

34. The system of claim 29, wherein the first electrical switch is mounted on a first panel.

35. The system of claim 34 wherein the second electrical switch is mounted on a second panel.

36. The system of claim 30, wherein the first bracket is adjacent to the first outlet port.

37. The system of claim 31, wherein the second bracket is adjacent to the second outlet port.

38. The system of claim 17, further comprising a fluid replacement system for at least one reservoir fluidically coupled thereto for permitting corresponding replacement fluid to be added to such reservoir such that the replacement fluid flows through a corresponding filter prior to entering the reservoir.

39. A fluid transfer system for removing fluid from first, second and third reservoirs of different types of fluids on an engine powered vehicle, the system comprising:
a first pump;
a first reservoir conduit coupling the first reservoir to the first pump;
a first outlet conduit coupling the first pump to a first outlet port for discharging fluid removed from said first reservoir through said first outlet port;
a second pump;
a control valve selectively controlling flow from the second and third reservoirs of different types of fluids to the second pump; and
a second reservoir conduit coupling the second reservoir to the control valve;
a third reservoir conduit coupling the third reservoir to the control valve;
a second pump conduit coupling the control valve to the second pump; and
a second outlet conduit coupling the second pump to a second outlet port for discharging fluid removed from a selected one of said second and third reservoirs through said second outlet port.

40. The system of claim 39, wherein the first and second pumps are mounted on the vehicle.

41. The system of claim 39, wherein the first pump is actuated through a first electrical switch.

42. The system of claim 41, wherein the second pump is actuated through a second electrical switch.

43. The system of claim 42, wherein the second electrical switch is mounted on a second bracket.

44. The system of claim 43, wherein the second bracket is adjacent to the second outlet port.

45. The system of claim 42, wherein the first and second electrical switches are mounted on a service panel.

46. The system of claim 45 wherein the first and second outlet ports are mounted on a service panel.

47. The system of claim 41, wherein the first electrical switch is mounted on a first bracket.

48. The system of claim 47, wherein the first bracket is adjacent to the first outlet port.

49. The system of claim 39, further comprising at least one sampling port for a corresponding reservoir.

50. The system of claim 39, further comprising a fluid replacement system for at least one reservoir fluidically coupled thereto for permitting corresponding replacement fluid to be added to such reservoir such that the replacement fluid flows through a corresponding filter prior to entering the reservoir.

51. A fluid transfer system for removing fluid from a plurality of reservoirs of different types of fluids on an engine powered vehicle including a first fluid reservoir and two or more other reservoirs of different types of fluids, the system comprising:
a first pump;
a first reservoir conduit coupling the first reservoir to the first pump;
a first outlet conduit coupling the first pump to a first outlet port for discharging fluid removed from said first reservoir through said first outlet port;
a second pump;
a control valve selectively controlling flow from the other reservoirs of different types of fluids to the second pump; and
other reservoir conduits, each of the other reservoir conduits coupling one of the other reservoirs of different types of fluids correspondingly to the control valve;
a second pump conduit coupling the control valve to the second pump; and
a second outlet conduit coupling the second pump to a second outlet port for discharging fluid removed from a selected one of said other reservoir through said second outlet port.

52. The system of claim 51, wherein the first and second pumps are mounted on the vehicle.

53. The system of claim 51 wherein the first pump comprises a gear pump.

54. The system of claim 51 wherein the second pump comprises a gear pump.

55. The system of claim 51 wherein the first pump is an engine prelubrication pump.

56. The system of claim 51, further comprising a fluid replacement system for at least one reservoir fluidically coupled thereto for permitting corresponding replacement fluid to be added to such reservoir such that the replacement fluid flows through a corresponding filter prior to entering the reservoir.

57. A fluid transfer system for removing fluid from first, second and third reservoirs of different types of fluids in connection with an engine powered vehicle having a first pump supported on the vehicle and operably connected to the first fluid reservoir, the system comprising:
a first network of conduits arranged to connect by couplings the first pump to a first outlet port for discharging fluid from said first reservoir through said first outlet port;
a second pump;
a control valve selectively controlling flow from the second and third reservoirs of different types of fluids to the second pump; and
a second network of conduits arranged to connect:
each of the second and third reservoirs of different types of fluids to the control valve;
the control valve to the second pump; and
the second pump to a second outlet port for discharging fluid from a selected one of the second and third reservoir through said second outlet port.

58. The system of claim 57 wherein the first pump is an engine prelubrication pump.

59. The system of claim 57, further comprising a fluid replacement system for at least one reservoir fluidically coupled thereto for permitting corresponding replacement fluid to be added to such reservoir such that the replacement fluid flows through a corresponding filter prior to entering the reservoir.

60. A system of total fluid service for an engine powered vehicle having at least two reservoirs of different types of fluids including a first fluid reservoir and at least one other reservoir of a different type of fluid, the system comprising:
a fluid evacuation system having a pump coupled to said first and at least one other reservoir for selectively removing fluids from the reservoirs of different types of fluids; and
a detachable fluid replacement system for selectively adding replacement fluids to the reservoirs of different types of fluids.

61. The system of claim 60, wherein the fluid replacement system comprises:
a portable replacement fluid conduit having a first and a second end, the first end connectable to a new fluid source and the second end detachably connectable to a corresponding fluid cavity coupled to one of the reservoirs such that the replacement fluid flows through a corresponding filter prior to entering the reservoir.

62. The system of claim 61, further comprising a flow meter valve attached to the replacement fluid conduit to regulate flow from the new fluid source to the corresponding fluid cavity.

63. The system of claim 62, wherein the first pump is actuated through a first electrical switch, the control valve is selectively actuated through a second electrical switch, and the first and second electrical switches are mounted on a service panel.

64. The system of claim 63 wherein the first and second outlet ports are mounted on the service panel.

65. The system of claim 60, wherein the fluid evacuation system comprises:
- a first pump;
- a first reservoir conduit coupling the first reservoir to the first pump;
- a first outlet conduit coupling the first pump to a first outlet port;
- a second pump;
- a control valve selectively controlling flow from at least one other reservoir to the second pump; and
- at least one other reservoir conduit, each of the other reservoir conduits coupling one of the other reservoirs correspondingly to the control valve;
- a second pump conduit coupling the control valve to the second pump; and
- a second outlet conduit coupling the second pump to a second outlet port.

66. The system of claim 65, wherein the first pump is actuated through a first electrical switch, the second pump is actuated through a second electrical switch, the first electrical switch is mounted on a first service panel and the second electrical switch is mounted on a second service panel.

67. The system of claim 66, wherein the first outlet port is mounted on the first service panel and the second outlet port is mounted on the second service panel.

68. The system of claim 65, wherein the first pump is actuated through a first electrical switch and the second pump is actuated through a second electrical switch.

69. The system of claim 68, wherein the first and second electrical switches are mounted on a bracket.

70. The system of claim 68, wherein the first electrical switch is mounted on a first bracket and the second electrical switch is mounted on a second bracket.

71. The system of claim 65, wherein at least one sampling port for a corresponding reservoir is mounted on a service panel.

72. The system of claim 60, further comprising a fluid replacement system for at least one reservoir fluidically coupled thereto for permitting corresponding replacement fluid to be added to such reservoir such that the replacement fluid flows through a corresponding filter prior to entering the reservoir.

73. A fluid transfer system for removing fluid from at least three reservoirs of different types of fluids on an engine powered vehicle including a first reservoir and at least two other reservoirs of different types of fluids, the system comprising:
- a first pump;
- a first reservoir conduit coupling the first reservoir to the first pump;
- a first outlet conduit coupling the first pump to a first outlet port for discharging fluid removed from said first reservoir through said first outlet port;
- a second pump;
- at least one other reservoir conduit, each of said other reservoir conduits coupling said other reservoirs to the second pump; and
- a second outlet conduit coupling the second pump to a second outlet port for discharging fluid removed from a selected one of said other reservoir through said second outlet port.

74. The system of claim 73, further comprising a fluid replacement system for at least one reservoir fluidically coupled thereto for permitting corresponding replacement fluid to be added to such reservoir such that the replacement fluid flows through a corresponding filter prior to entering the reservoir.

75. A fluid transfer system for removing fluids from a plurality of reservoirs of different types of fluids on an engine powered apparatus, the system comprising:
- a pump fluidically coupled to each of said reservoirs; and
- a pump controller operably connected to the pump; and
- a flow controller coupled between the reservoirs and the pump to control from which reservoir fluid is removed.

76. The system of claim 75 wherein said flow controller comprises a control valve.

77. The system of claim 76 wherein the controls for said pump controller and said flow controller are mounted on a service panel.

78. The system of claim 75 wherein said pump is mounted on said apparatus.

79. A fluid transfer system for removing fluids from a plurality of fluid reservoirs of different types of fluids on an engine powered vehicle, the system comprising:
- a pump;
- a control valve assembly;
- a plurality of fluid conduits fluidically coupling said plurality of fluid reservoirs to said control valve assembly, fluidically coupling said control valve assembly to said pump, and fluidically coupling the pump to an outlet port;
- wherein the plurality of reservoirs comprise at least two of engine oil, transmission fluid, and hydraulic fluid reservoirs of said vehicle, and said control valve assembly is operable to selectively communicate a selected one of the plurality of reservoirs with said pump through at least one said fluid conduit for draining said selected one of the plurality of reservoirs through said outlet port.

80. The system of claim 79, wherein the pump is mounted on the vehicle.

81. The system of claim 79, further comprising a flexible conduit coupled to the outlet port.

82. The system of claim 79, wherein the pump is mounted on an apparatus separate and remote from said vehicle.

83. The system of claim 79, wherein the vehicle has a battery and the pump is operatively coupled to, so as to be selectively powered by, the battery.

84. A fluid transfer system for removing fluids from first, second and third fluid reservoirs of different types of fluids on an engine powered vehicle, the system comprising:
- a first pump;
- a first network of fluid conduits fluidically coupling said first reservoir to said first pump and fluidically coupling the first pump to a first outlet port for discharging fluid removed from the first reservoir;
- a second pump;
- a control valve assembly;

a second network of fluid conduits fluidically coupling said second and third reservoirs to said control valve assembly, fluidically coupling said control valve assembly to said second pump, and fluidically coupling the second pump to a second outlet port;

wherein the first reservoir comprises an engine oil reservoir of said vehicle, and the second and third reservoirs comprise transmission and hydraulic reservoirs, respectively, of said vehicle and said control valve assembly is operable to selectively communicate a selected one of said second and third reservoirs with said second pump through at least one of the fluid conduits of said second network of fluid conduits for draining said selected one of said second and third reservoirs through said outlet port.

85. The system of claim 84, wherein the first and second pumps are mounted on the vehicle.

86. The system of claim 84, further comprising first and second flexible conduits coupled to the first and second outlet ports, respectively.

87. The system of claim 84, wherein the vehicle has a battery and the first and second pumps are operatively coupled to, so as to be selectively powered by, the battery.

88. The system of claim 84, further comprising a first electrical control switch operatively coupled to said first pump to selectively control actuation thereof, said first switch being disposed remote from said first pump, adjacent the first outlet port.

89. The system of claim 84, further comprising a controller for controlling said control valve assembly to select the selected one of the plurality of reservoirs for communication with said pump, said controller being provided remote from said control valve assembly.

90. The system of claim 84, wherein the first pump comprises a prelubrication pump mounted on the vehicle.

91. The system of claim 84, further comprising a controller for controlling said control valve assembly to select the selected one of the second and third reservoirs for communication with said second pump, said controller being provided remote from said control valve assembly.

* * * * *

UNITED STATES PATENT AND TRADEMARK OFFICE
CERTIFICATE OF CORRECTION

PATENT NO. : 6,941,969 B2
DATED : September 13, 2005
INVENTOR(S) : Apostolides

It is certified that error appears in the above-identified patent and that said Letters Patent is hereby corrected as shown below:

Column 1,
Line 49, delete "Engine" and insert -- engine --.

Column 2,
Line 4, delete "4,997,978" and insert -- 4,977,978 --.

Column 3,
Line 27, delete "apart" and insert -- a part --.
Line 30, delete "external, pump" and insert -- external pump --.

Column 7,
Line 35, delete "for with the" and insert -- for use with --.

Column 8,
Line 39, delete "through of a network" and insert -- through a network --.
Line 55, delete "may be used connect" and insert -- may be used to connect --.

Column 11,
Line 50, delete "reservoir" and insert -- reservoirs --.

Column 14,
Lines 5 and 40, delete "reservoir" and insert -- reservoirs --.

Column 16,
Line 7, delete "reservoir" and insert -- reservoirs --.

Signed and Sealed this

Second Day of May, 2006

JON W. DUDAS
*Director of the United States Patent and Trademark Office*